(12) United States Patent
Fan (10) Patent No.: US 11,159,037 B2
(45) Date of Patent: Oct. 26, 2021

(54) CHARGING METHOD AND ELECTRONIC DEVICE

(71) Applicant: BEIJING XIAOMI MOBILE SOFTWARE CO., LTD., Beijing (CN)

(72) Inventor: Jie Fan, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 248 days.

(21) Appl. No.: 16/410,765

(22) Filed: May 13, 2019

(65) Prior Publication Data
US 2020/0014217 A1  Jan. 9, 2020

(30) Foreign Application Priority Data
Jul. 3, 2018  (CN) .......................... 201810716578.5

(51) Int. Cl.
*H02J 7/00* (2006.01)
(52) U.S. Cl.
CPC ............ *H02J 7/007* (2013.01); *H02J 7/0029* (2013.01); *H02J 7/0071* (2020.01); *H02J 7/00712* (2020.01); *H02J 7/00714* (2020.01)
(58) Field of Classification Search
CPC ...... H02J 7/007; H02J 7/0071; H02J 7/00712; H02J 7/00714; H02J 7/0029
(Continued)

(56) References Cited

U.S. PATENT DOCUMENTS 5,710,506 A * 1/1998 Broell ................. H02J 7/00711
320/145

2016/0218542 A1  7/2016 Li et al.
(Continued)

FOREIGN PATENT DOCUMENTS

CN  106712219 A  5/2017
CN  106785134 A  5/2017
(Continued)

OTHER PUBLICATIONS

First Office Action issued to Chinese Application No. 201810716578.5 dated Jan. 3, 2020, and English translation (19p)
(Continued)

*Primary Examiner* — Edward Tso
*Assistant Examiner* — Aaron Piggush
(74) *Attorney, Agent, or Firm* — Arch & Lake LLP (57) ABSTRACT

A charging method and an electronic device are provided. The electronic device includes a charging interface, a charging circuit and a battery. The charging circuit includes a high-voltage direct-charging chip, an output end of the charging interface is connected to an input end of the high-voltage direct-charging chip, and an output end of the high-voltage direct-charging chip is connected to the battery to output charging current to the battery. The method includes: turning on the high-voltage direct-charging chip; outputting a first current to the high-voltage direct-charging chip through the charging interface; and increasing the charging current by a first predetermined current and then outputting the charging current to the battery through the high-voltage direct-charging chip every time till the charging current reaches a first target current such that the voltage of the battery is increased slowly to leave enough time for detection.

13 Claims, 6 Drawing Sheets

(58) Field of Classification Search
USPC ................ 320/134, 140, 152, 159, 162, 164
See application file for complete search history.

(56) References Cited

U.S. PATENT DOCUMENTS

| | | |
|---|---|---|
| 2017/0077719 A1 | 3/2017 | Onat |
| 2017/0104354 A1 | 4/2017 | Toguchi |
| 2017/0157413 A1* | 6/2017 | Anderson ............ A61N 1/3621 |
| 2018/0034296 A1 | 2/2018 | Zhang et al. |
| 2018/0069407 A1 | 3/2018 | Herrera et al. |

FOREIGN PATENT DOCUMENTS

| | | |
|---|---|---|
| CN | 106786843 A | 5/2017 |
| CN | 106849270 A | 6/2017 |
| CN | 107579572 A | 1/2018 |
| CN | 107612072 A | 1/2018 |

OTHER PUBLICATIONS

Extended European Search Report of counterpart EP Application No. 19182986.0 dated Nov. 22, 2019, (8p).

\* cited by examiner

CHARGING METHOD AND ELECTRONIC DEVICE

This application claims the priority to the Chinese Patent Application No. 2018107165785, filed on Jul. 3, 2018 and titled "CHARGING METHOD AND ELECTRONIC DEVICE," the disclosure of which are incorporated herein by reference in its entirety.

TECHNICAL FIELD

The present disclosure relates to the field of electronic technologies, and in particular to a charging method and an electronic device.

BACKGROUND

With the continuous advancement of the electronic technology, electronic devices, such as mobile phones and tablet computers etc., have become commonly used devices in people's daily life. These electronic devices cannot work normally without being charged and the charging speed has become a great concern to the users.

Figure 1:
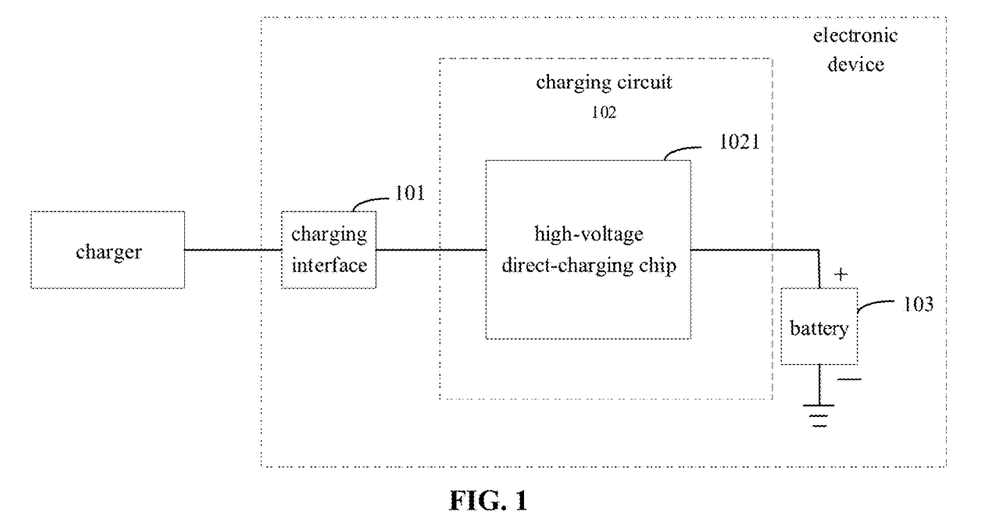
FIG. 1 is a schematic diagram illustrating a structure of an electronic device in the related art.

A high-voltage direct-charging technology applied to an electronic device is provided in the related art. FIG. 1 shows a schematic view of a structure of the electronic device which comprises a charging interface 101, a charging circuit 102 and a battery 103. The charging circuit 102 comprises a high-voltage direct-charging chip 1021. An output end of the charging interface 101 is connected to an input end of the high-voltage direct-charging chip 1021. An output end of the high-voltage direct-charging chip 1021 is connected to the battery 103.

During charging, a charger is connected to the charging interface 101 and outputs a first voltage and a first current to the high-voltage direct-charging chip 1021 through the charging interface 101. The high-voltage direct-charging chip 1021 doubles the current while halving the voltage to obtain a target voltage that is half of the first voltage and a target current that is two times of the first current. The target voltage and the target current are output to the battery 103. In this way, a low voltage and a high current are output to the battery 103 after a high voltage and a low current are input into the high-voltage direct-charging chip 1021. The characteristic of high charging current is achieved. The charging efficiency is improved.

SUMMARY

The present disclosure provides a charging method and an electronic device, capable of solving the problem in the related art.

According to an aspect of the embodiments of the present disclosure, there is provided a charging method applied to an electronic device which comprises a charging interface, a charging circuit and a battery, the charging circuit comprises a high-voltage direct-charging chip, an output end of the charging interface is connected to an input end of the high-voltage direct-charging chip, an output end of the high-voltage direct-charging chip is connected to the battery to output a charging current to the battery, the method may include at least following acts: turning on the high-voltage direct-charging chip; outputting a first current to the high-voltage direct-charging chip through the charging interface; and increasing the charging current by a first predetermined current, and then outputting the charging current to the battery through the high-voltage direct-charging chip every time till the charging current reaches a first target current which is a working current of the high-voltage direct-charging chip.

According to another aspect of the present disclosure, there is provided an electronic device, comprising a charging interface, a charging circuit and a battery, wherein the charging circuit comprises a high-voltage direct-charging chip, an output end of the charging interface is connected to an input end of the high-voltage direct-charging chip, and an output end of the high-voltage direct-charging chip is connected to the battery; and the electronic device is configured to execute the charging method in the first aspect.

It should be understood that foregoing general description and the following detailed description are exemplary only, and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

The present disclosure will be described in further detail with reference to the accompanying drawings, to clearly present the objects, technical solutions, and advantages of the present disclosure. Herein, the exemplary implementations in the present disclosure and descriptions thereof are intended to explain the present disclosure, rather than limit the present disclosure.

A high-voltage direct-charging technology and a low-voltage direct-charging technology are introduced first.

The high-voltage direct-charging technology lies in that a voltage/current output by a charger end is output to a high-voltage direct-charging chip, and the high-voltage direct-charging chip halves the voltage and doubles the current to obtain a target current, and then outputs the target current to a battery to realize high-current charging.

The low-voltage direct-charging technology lies in that a current output by a charger end is output to a master charging chip, and the master charging chip directly outputs the current to a battery to charge the battery without halving the voltage.

The embodiments of the present disclosure provide a charging method and an electronic device. The present disclosure will be described in detail below with reference to the accompanying drawings.

Figure 2:
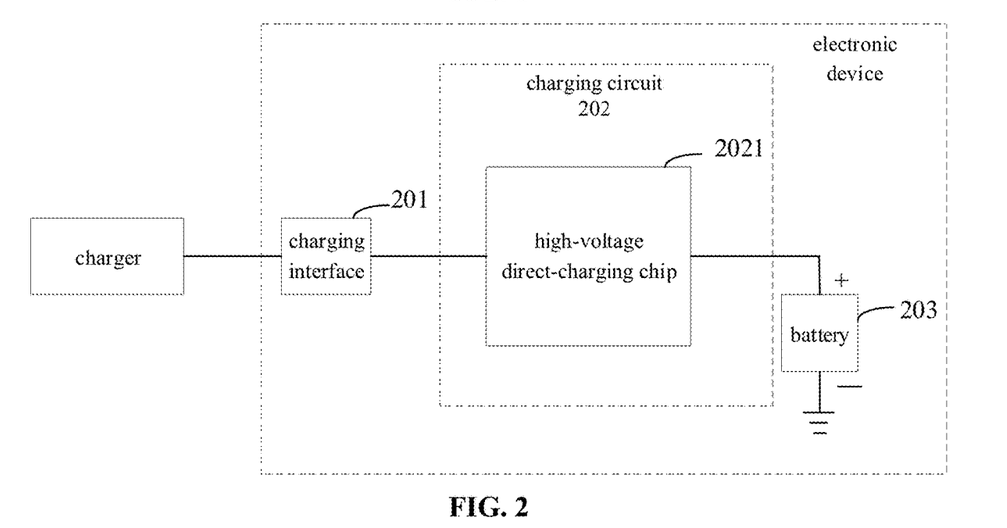
FIG. 2 is a schematic diagram illustrating a structure of an electronic device according to an example.

FIG. 2 is a schematic view illustrating a structure of an electronic device according to an example. Referring to FIG. 2, the electronic device includes a charging interface 201, a charging circuit 202 and a battery 203. The charging circuit 202 includes a high-voltage direct-charging chip 2021. An output end of the charging interface 201 is connected to an input end of the high-voltage direct-charging chip 2021. An output end of the high-voltage direct-charging chip 2021 is connected to the battery 203 to output a charging current to the battery 203.

During the charging process, a charger is connected to the charging interface 201 and outputs a current to the charging interface 201. Then, the charging interface 201 outputs the current to the high-voltage direct-charging chip 2021. The high-voltage direct-charging chip 2021 outputs a charging current to the battery 203 to charge the battery 203.

In the embodiment of the present disclosure, the high-voltage direct-charging chip 2021 obtains a first target current by stepped increase of the current instead of halving a voltage and doubling the current. The charging current is output to the battery 203 after being increased by a first predetermined current every time till the charging current reaches the first target current. Therefore, the voltage of the battery 203 is slowly increased. It is ensured that a voltage rise of the battery can be detected in time. The situation that the voltage of the battery exceeds a safety voltage due to the failure to detect the rise of the battery voltage in time can be avoided. Accordingly, the safety is improved.

Figure 3:
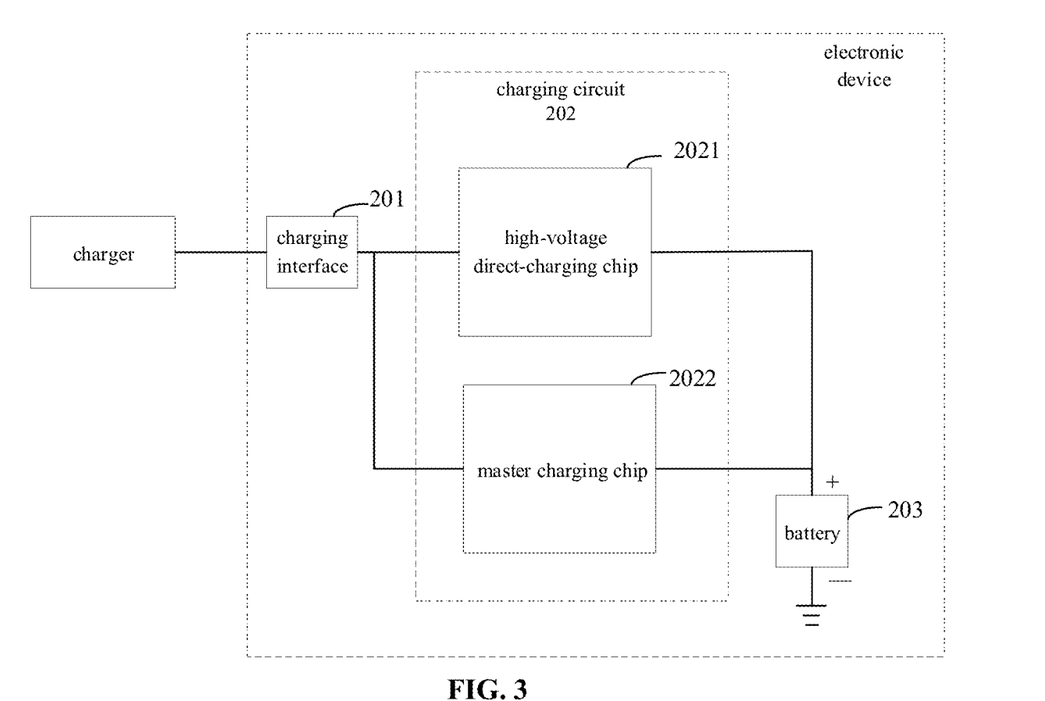
FIG. 3 is a schematic diagram illustrating a structure of another electronic device according to an example.

In a possible implementation, referring to FIG. 3, the charging circuit 202 further includes a master charging chip 2022. The output end of the charging interface 201 is connected to an input end of the master charging chip 2022. An output end of the master charging chip 2022 is connected to the battery 203.

During the charging process, when the high-voltage direct-charging chip 2021 charges the battery 203 and the charging current reaches a second target current, the high-voltage direct-charging chip 2021 may be turned off, and the master charging chip 2022 charges the battery 203.

Figure 4:
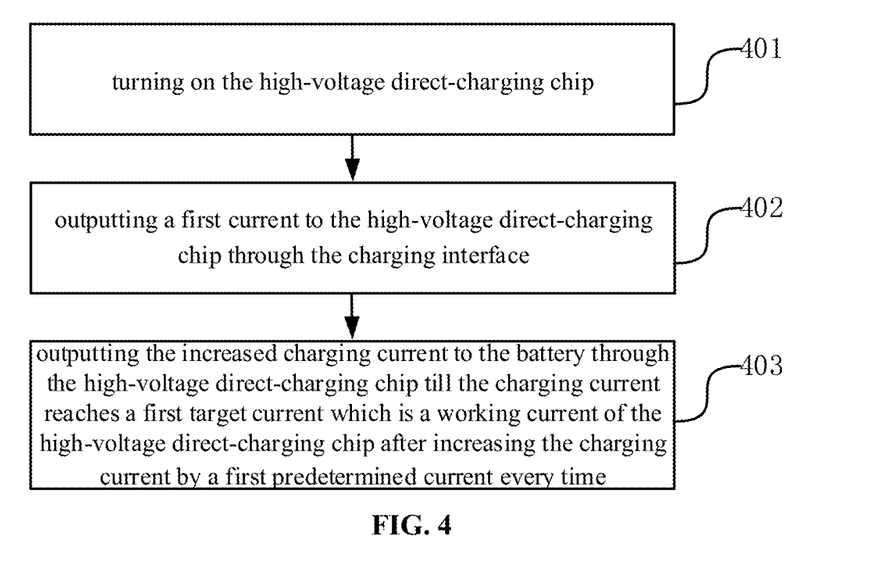
FIG. 4 is a flow chart showing a charging method according to an example.

Based on the electronic device illustrated in FIG. 2 and FIG. 3, an embodiment of the present disclosure provides a charging method applied to the electronic device. FIG. 4 is a flowchart of a charging method according to an example. As shown in FIG. 4, the charging method includes the following steps:

step 401: turning on the high-voltage direct-charging chip;

step 402: outputting a first current to the high-voltage direct-charging chip through the charging interface; and step 403: after increasing the charging current by a first predetermined current every time, outputting the increased charging current to the battery through the high-voltage direct-charging chip till the charging current reaches a first target current which is a working current of the high-voltage direct-charging chip.

In the related art, during charging, a high-voltage direct-charging chip rapidly doubles the charging current to obtain the target current, and output the target current to the battery, resulting in that the voltage of the battery rises quickly and easily exceeds the safety voltage. However, the detection mechanism of the charging circuit usually lags behind the rise of the battery voltage, and thus, cannot timely detect the event that the voltage of the battery exceeds the safety voltage such that the battery cannot be protected in time. Moreover, if the aforesaid overvoltage phenomenon occurs repeatedly, it will lead to a safety hazard.

According to the charging method provided by the embodiment of the present disclosure, the charging current is output to the battery after being increased by a first predetermined current every time through the high-voltage direct-charging chip till the charging current reaches a first target current, such that the voltage of the battery is increased slowly to reserve enough time for detection. Thus, the situation that the voltage of the battery exceeds a safety voltage due to the failure to detect the rise of the battery voltage in time can be avoided. Accordingly, the safety is improved.

In a possible implementation, the method further comprises:

when the charging current reaches the first target current, after reducing the charging current by a second predetermined current every time, outputting the reduced charging current to the battery through the high-voltage direct-charging chip till the charging current reaches a second target current which is the charging current when the battery is fully charged, in which the second target current is lower than the first target current.

In another possible implementation, the method further comprises:

when the charging current reaches the first target current, after reducing the charging current by a second predetermined current every time, outputting the reduced charging current to the battery through the high-voltage direct-charging chip; and when the charging current reaches a third target current, after reducing the charging current by a third predetermined current every time, outputting the reduced charging current to the battery till the charging current reaches a second target current which is the charging current when the battery is fully charged, wherein the third predetermined current is lower than the second predetermined current, the second target current is lower than the first target current, and the third predetermined current is lower than the first target current and higher than the second target current.

In another possible implementation, the charging circuit further comprises a master charging chip, the output end of the charging interface is connected to an input end of the master charging chip, an output end of the master charging chip is connected to the battery, and the charging method further comprises:

when the charging current reaches the second target current, turning off the high-voltage direct-charging chip and turning on the master charging chip.

In another possible implementation, an input end of the charging interface is connected to an output end of a charger, and the charging method further comprises:

outputting a second current, which is lower than the first current, to the high-voltage direct-charging chip through the charging interface under the condition that the high-voltage direct-charging chip is turned off;

acquiring a voltage at the output end of the charger and a voltage at the input end of the high-voltage direct-charging chip;

obtaining a first line impedance between the charger and the high-voltage direct-charging chip in accordance with the second current, the voltage at the output end of the charger and the voltage at the input end of the high-voltage direct-charging chip; and executing the step of turning on the high-voltage direct-charging chip when the first line impedance is smaller than a predetermined impedance.

In another possible implementation, the method further comprises:

acquiring the voltage at the output end of the charger and the voltage at the input end of the high-voltage direct-charging chip in a process that the charging interface outputs the first current to the high-voltage direct-charging chip; and obtaining a second line impedance between the charger and the high-voltage direct-charging chip in accordance with the first current, the voltage at the output end of the charger and the voltage at the input end of the high-voltage direct-charging chip.

In another possible implementation, the method further comprises:

when a difference value between the first line impedance and the second line impedance is greater than a predetermined threshold, turning off the high-voltage direct-charging chip, outputting the second current to the high-voltage direct-charging chip by the charging interface, and re-executing the step of obtaining the first line impedance.

Figure 5:
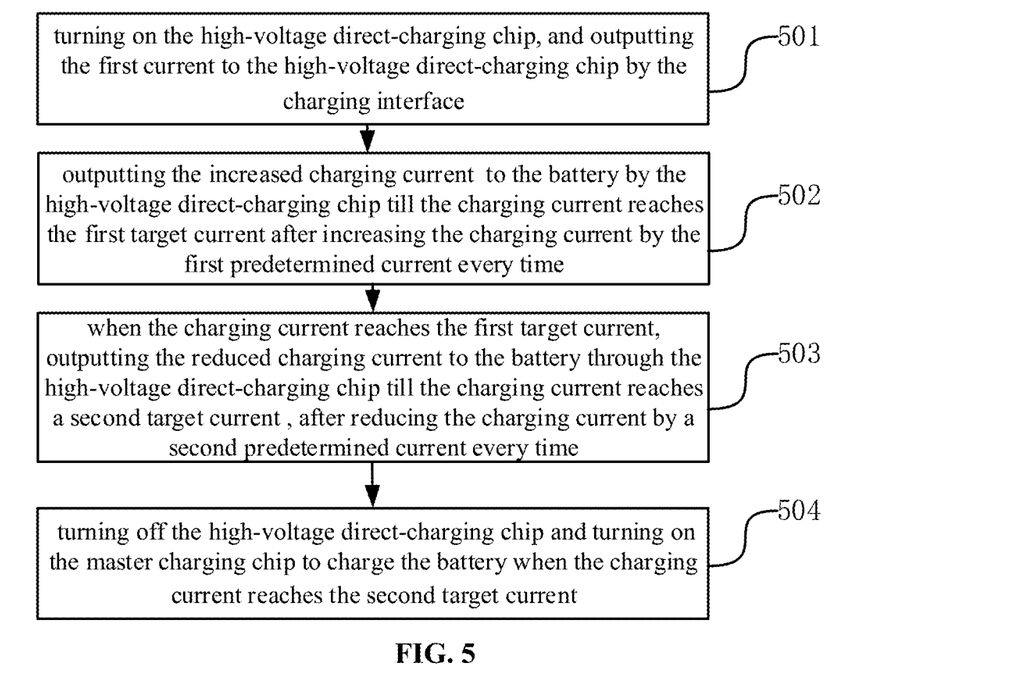
FIG. 5 is a flow chart showing another charging method according to an example.
Figure 6:
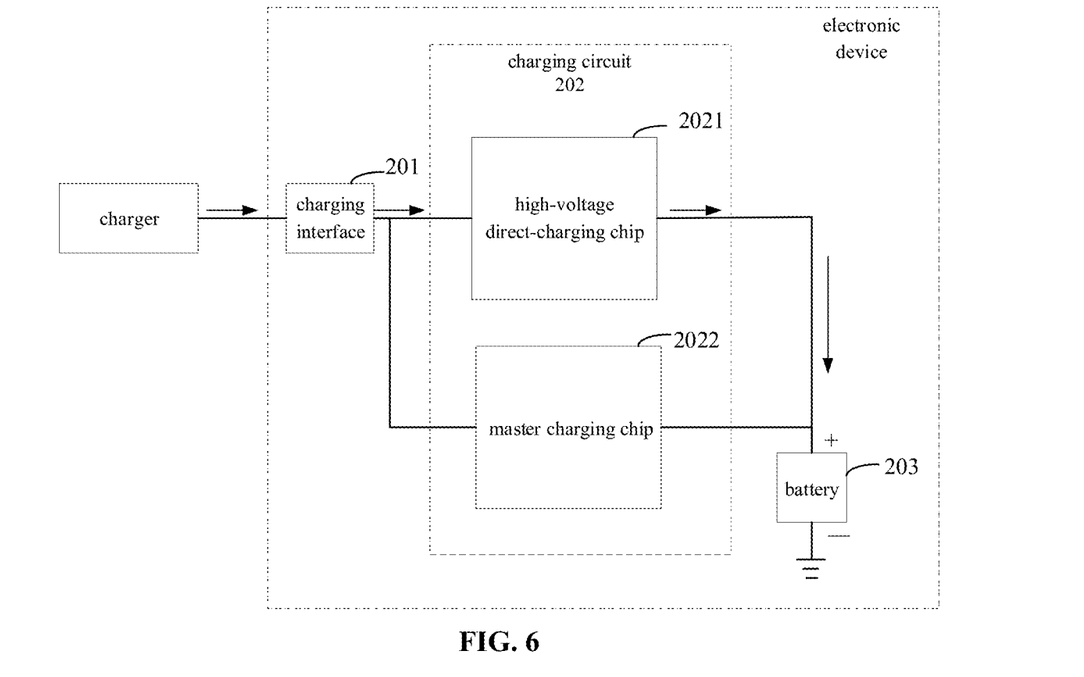
FIG. 6 is a schematic view of a current flow direction during a charging process for a high-voltage direct-charging chip according to an example.
Figure 7:
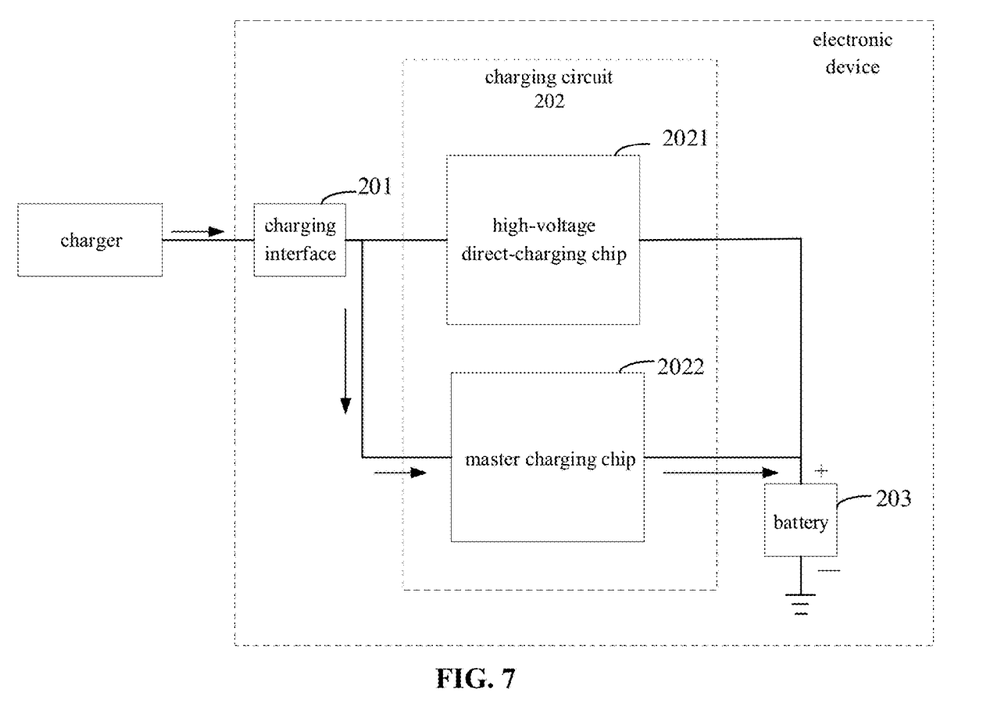
FIG. 7 is a schematic view of a current flow direction during a charging process for a master charging chip according to an example.

FIG. 5 is a flow chart of a charging method according to an example. FIG. 6 and FIG. 7 are schematic views of current flow directions according to an example. As shown in FIGS. 5-7, the charging method includes the following steps.

In step 501, the high-voltage direct-charging chip is turned on, and the first current is output to the high-voltage direct-charging chip by the charging interface.

During the charging process, the high-voltage direct-charging chip is t while the master charging chip is turned off. At this time, the charger is connected to the charging interface through a data cable and outputs the current to the charging interface. The charging interface outputs the first current to the high-voltage direct-charging chip. The schematic view of the current flow direction in the charging process may be as shown in FIG. 6.

In step 502, after increasing the charging current by the first predetermined current every time, the increased charging current is output to the battery by the high-voltage direct-charging chip till the charging current reaches the first target current.

In the embodiment of the present disclosure, the battery has the safety voltage. It is believed that the battery is in a safe state when the voltage of the battery is lower than the safety voltage. When the voltage of the battery is greater than or equal to the safety voltage, it means that the battery has an excessive voltage which may impact the safety of the battery. However, when the working current of the high-voltage direct-charging chip is the first target current, the charging current needs to be increased to the first target current and the first target current is adopted to charge the battery when the high-voltage direct-charging chip charges the battery. The specific value of the first target current may be determined in accordance with the working performance of the high-voltage direct-charging chip.

Once the high-voltage direct-charging chip doubles the first current and then outputs the first target current to the battery, the voltage of the battery may be rapidly increased and thus may exceed the safety voltage to lead to a safety hazard. For example, if R represents internal resistance of the battery, and I represents the charging current, a voltage U1 consumed on the internal resistance of the battery is equal to R*I. If the electricity quantity of the battery is denoted as U2, the voltage U of the battery, which may be detected, is equal to U1+U2. U may not be more than the safety voltage. When the charging current I is increased rapidly, the voltage U of the battery is also increased rapidly. Particularly, when the battery of the electronic device has sufficient electric quantity and high enough voltage, the voltage U of the battery may easily exceed the safety voltage if a user still performs charging.

To avoid this situation, the high-voltage direct-charging chip receives the first current output by the charging interface. Instead of directly doubling the first current to obtain the first target current and outputting the obtained first target current to the battery, a stepped current increase mode is adopted to output the charging current which is increased by the first predetermined current every time to the battery, such that the voltage of the battery is slowly increased till the charging current reaches the first target current.

For example, if the first current is 1 A (ampere), the first predetermined current is 200 mA (milliampere), and the first target current is 5 A, the current is increased with a step of 200 mA every time till the charging current is increased to 5 A.

In step 503, when the charging current reaches the first target current, after increasing the charging current by the first predetermined current every time, the increased charging current is output to the battery by the high-voltage direct-charging chip till the charging current reaches a second target current. The second target current is lower than the first target current.

Owing to the relatively higher charging current provided by the high-voltage direct-charging chip, and under the action of the internal resistance in the battery, the battery is actually not fully charged when the charging current reaches the first target current. Thus, at this time, the high-voltage direct-charging chip continuously performs charging instead of being turned off.

In view of the relatively higher voltage of the battery at this time, continuous charging may cause the voltage of the battery to exceed the safety voltage. Thus, instead of continuously increasing the current, the high-voltage direct-charging chip may reduce the charging current by the second predetermined value and then output the reduced charging current to the battery. The battery is charged by means of stepped current reduction. The voltage of the battery is slowly increased and prevented from being too high. Correspondingly, the safety of the battery in the charging process is guaranteed.

The second target current refers to the charging current when the battery is fully charged. The specific value thereof may be determined in accordance with the performance of the battery. It can be considered that the battery is fully charged when the charging current reaches the second target current.

In a possible implementation, when the charging current reaches the first target current, the charging current is output to the battery after being reduced by the second predetermined current every time through the high-voltage direct-charging chip. When the charging current reaches a third target current, the charging current is output to the battery after being reduced by a third predetermined current every time till the charging current reaches the second target current.

The third predetermined current is lower than the second predetermined current. The second target current is lower than the first target current. The third predetermined current is lower than the first target current and higher than the second target current.

As the high-voltage direct-charging chip continuously provides the charging current for the battery, the voltage of the battery is gradually increased to be approximate to the safety voltage. At this time, in order to fully charge while guaranteeing the safety of the battery, the charging current may be reduced by the smaller third predetermined current after being reduced by the second predetermined current, such that the voltage of the battery is slowly increased with a smaller amplitude.

For example, if the second predetermined current is 1 A and the third predetermined current is 200 mA, when the charging current is 5 A, the charging current may be output to the battery after being reduced by 1 A every time through the high-voltage direct-charging chip. When the charging current is 2 A, the amplitude 1 A of the original current reduction is adjusted to 200 mA, and the charging current is reduced by 200 mA every time and then output to the battery.

It should be noted that the second predetermined current and the third predetermined current may be determined in accordance with the demands on the charging efficiency and the charging sufficiency.

In step 504, when the charging current reaches the second target current, the high-voltage direct-charging chip is turned off and the master charging chip is turned on to charge the battery.

When the charging current reaches the second target current, it is considered that the battery is fully charged. At this time, the high-voltage direct-charging chip is turned off and the master charging chip is turned on, such that the battery is charged by using the low-voltage direct-charging technology to ensure that can be fully charged. The schematic view of a current flow direction in the charging process may be as shown in FIG. 7.

The embodiment of the present disclosure provides the charging method. The charging current is output to the battery after being increased by the first predetermined current every time through the high-voltage direct-charging chip till the charging current reaches the first target current, such that the voltage of the battery is increased slowly to reserve enough time for detection. Thus, the situation that the voltage of the battery exceeds a safety voltage due to the failure to detect the increase of the battery voltage in time can be avoided. Accordingly, the safety is improved. Some emergencies may be dealt with timely. Advantages and disadvantages of the high-voltage direct-charging technology are analyzed, such that the high-voltage direct-charging technology may be played better.

Figure 8:
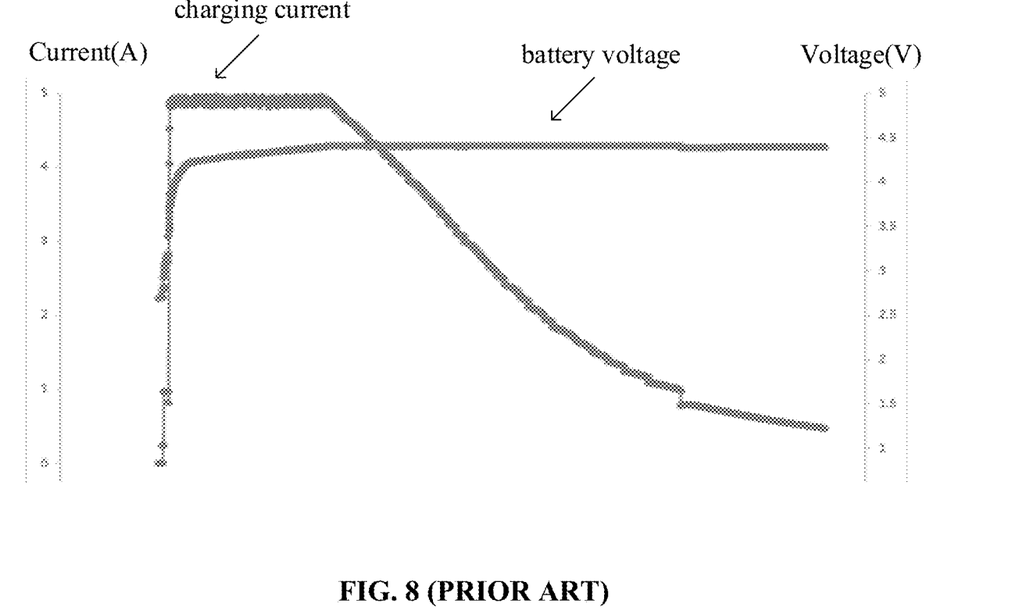
FIG. 8 is a schematic view of a charging current and a battery voltage in the related art.
Figure 9:
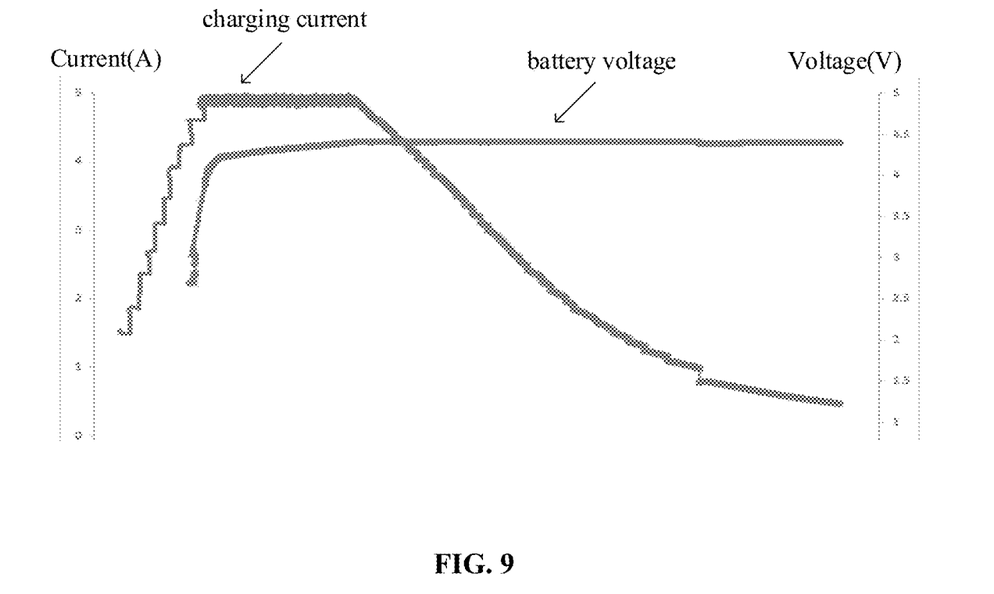
FIG. 9 a schematic view of a charging current and a battery voltage according to an example.

FIG. 8 is a schematic view of a charging current and a battery voltage that are provided by the related art. FIG. 9 is a schematic view of a charging current and a battery voltage that are provided by an embodiment of the present disclosure. By comparison between FIG. 8 and FIG. 9, it may be determined that rapid rises of the charging current and the battery voltage in the related art cause the battery voltage to rapidly reach a safety voltage 4.4 V. A stepped rise of the charging current in the embodiments of the present disclosure causes the battery voltage to slowly rise to the safety voltage 4.4 V.

Figure 10:
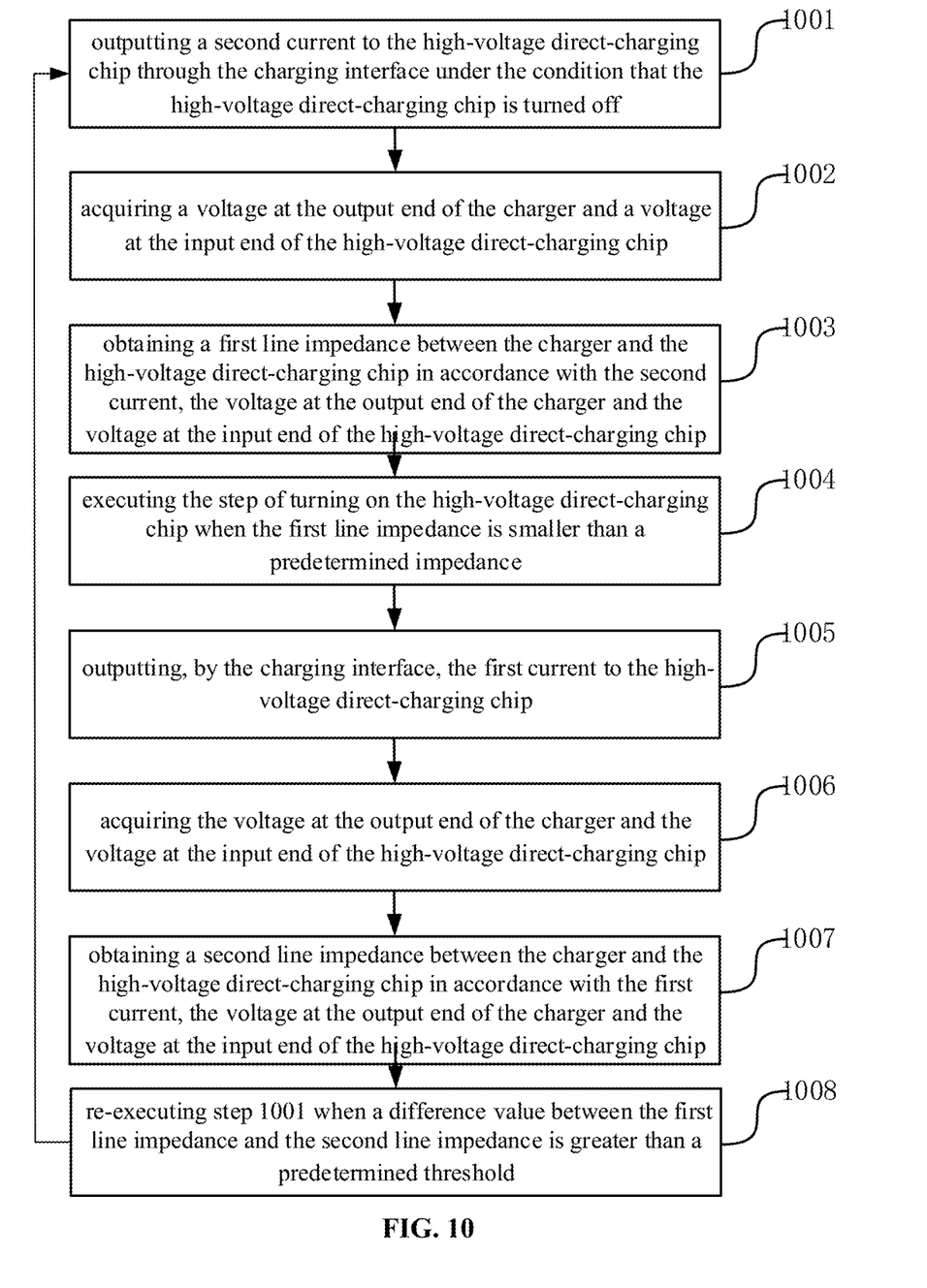
FIG. 10 is a flow chart showing a charging method according to an example.

Based on the embodiments illustrated in FIG. 4 and FIG. 5, an embodiment of the present disclosure further provides a charging method. FIG. 10 is a flow chart of a charging method according to an example. As shown in FIG. 10, the charging method includes the following steps.

In step 1001, a second current is output to the high-voltage direct-charging chip through the charging interface under the condition that the high-voltage direct-charging chip is turned off.

In a pre-charging stage, the high-voltage direct-charging chip is turned off. A charger is connected to the charging interface and outputs a current to the charging interface. The charging interface outputs the second current to the high-voltage direct-charging chip. Herein, the second current may be a relatively lower current, for example, a current of 500 mA to 1 A.

In step 1002, a voltage at an output end of the charger and a voltage at an input end of the high-voltage direct-charging chip are acquired.

Herein, the charger is connected to the charging interface through a data cable. The voltage at the output end of the charger may be detected and sent to an electronic device through the data cable and the charging interface, such that the electronic device may acquire the voltage at the output end of the charger. Besides, the electronic device may further detect the voltage at the input end of the high-voltage direct-charging chip.

In step 1003, a line impedance between the charger and the high-voltage direct-charging chip is obtained as a first line impedance in accordance with the second current, the voltage at the output end of the charger and the voltage at the input end of the high-voltage direct-charging chip.

That is, a voltage difference between the voltage at the output end of the charger and the voltage at the input end of the high-voltage direct-charging chip is calculated. A quotient of the voltage difference to the second current is calculated as the first line impedance. If V1 represents the voltage at the output end of the charger, V2 represents the voltage at the input end of the high-voltage direct-charging chip and I represents the second current, the first line impedance is (V1-V2)/I.

In step 1004, the high-voltage direct-charging chip is turned on when the first line impedance is less than a predetermined impedance.

In consideration that a line between the charger and the high-voltage direct-charging chip has a certain impedance, and the high-voltage direct-charging technology may not meet a working demand unless the voltage of the battery is increased to a certain value, if the line impedance between the charger and the high-voltage direct-charging chip is excessively large, an excessive voltage drop may be caused, and the high-voltage direct-charging chip may not work normally. Consequently, the charging efficiency is reduced. Therefore, in the pre-charging stage before formal charging, by calculating the line impedance between the charger and the high-voltage direct-charging chip, it can be determined whether the electronic device can be charged by using the high-voltage direct-charging technology in accordance with the magnitude of the line impedance.

When the first line impedance is less than the predetermined impedance, it means that the line impedance between the charger and the high-voltage direct-charging chip is not large, and the high-voltage direct-charging technology may be adopted to improve the charging efficiency. Thus, the high-voltage direct-charging chip can be turned on to charge the battery.

In another embodiment, when the first line impedance is greater than or equal to the predetermined impedance, it means that the line impedance between the charger and the high-voltage direct-charging chip is too large, and the charging efficiency may still be reduced when the high-voltage direct-charging technology is adopted. Thus, the high-voltage direct-charging chip is turned off, and the master charging chip is turned on to charge the battery.

In step 1005, a first current is output to the high-voltage direct-charging chip by the charging interface.

After the high-voltage direct-charging chip is turned on, the charger outputs a current to the charging interface. The charging interface outputs the first current to the high-voltage direct-charging chip.

The step 1005 and the step 401 are similar to each other and are different in that the step 1005 is the formal charging stage, the first current is higher than the second current in the pre-charging stage.

In step 1006, the voltage at the output end of the charger and the voltage at the input end of the high-voltage direct-charging chip are acquired.

In step 1007, a line impedance between the charger and the high-voltage direct-charging chip is obtained as a second line impedance in accordance with the first current, the voltage at the output end of the charger and the voltage at the input end of the high-voltage direct-charging chip.

A calculation mode of the second line impedance is similar to that of the first line impedance in the steps 1001-1003, and will not be repeated herein.

In step 1007, the step 1001 is re-executed when a difference value between the second line impedance and the first line impedance is greater than a predetermined threshold.

After being obtained during the charging process, the second line impedance is compared with the first line impedance obtained in the pre-charging stage, and the difference value therebetween is calculated. When the difference value between the first line impedance and the second line impedance is greater than the predetermined threshold, it means that the difference between the line impedances obtained twice is too large. A calculation error, such as a voltage detection error or poor plugging in of a plug of the charger, may occur. At this time, the high-voltage direct-charging chip is turned off. The first line impedance is obtained again, such that a mechanism for impedance re-detection is added. Thus, the safety of the battery is guaranteed.

In another embodiment, when the difference value between the second line impedance and the first line impedance is less than or equal to the predetermined threshold, it means that the obtained line impedance is accurate. Then, charging may be continuously performed.

According to the charging method provided by the embodiment of the present disclosure, the line impedance between the output end of the charger and the input end of the high-voltage direct-charging chip is obtained in the pre-charging stage, such that the line impedance is estimated and whether the electronic device may be charged by the high-voltage direct-charging technology is judged. Thus, basic data are provided for the follow-up high-voltage direct-charging process. The charging efficiency can be improved when the high-voltage direct-charging technology is adopted for charging without excessive voltage drop.

The embodiments disclosed by the present disclosure may have the following beneficial effects. According to the charging method and the electronic device which are provided by the embodiments of the present disclosure, the charging current is output to the battery after being increased by the first predetermined current through the high-voltage direct-charging chip every time till the charging current reaches the first target current, such that the voltage of the battery is increased slowly to reserve enough time for detection. Thus, the voltage of the battery may not exceed a safety voltage because a voltage rise of the battery may be successfully detected in time. Accordingly, the safety is improved.

In addition, after the charging current reaches the first target current, the battery is charged by means of stepped reduction of the charging current. The voltage of the battery is slowly increased and prevented from being too high. Thus, charging is fully conducted under the condition of ensuring the safety of the battery.

Moreover, the line impedance between the output end of the charger and the input end of the high-voltage direct-charging chip is obtained in a pre-charging stage. Whether the electronic device may be charged by the high-voltage direct-charging technology is judged. The charging efficiency may be improved without an excessive voltage drop when the high-voltage direct-charging technology is adopted for charging.

Other embodiments of the present disclosure will be apparent to those skilled in the art from consideration of the specification and practice of the invention disclosed here. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the precise construction that has been described above and illustrated in the accompanying drawings, and that various modifications and changes can be made without departing from the scope thereof. It is intended that the scope of the present disclosure is only to be limited by the appended claims

What is claimed is:

1. A charging method, applied to an electronic device that comprises a charging interface, a charging circuit, and a battery, the charging circuit comprising a high-voltage direct-charging chip, the method comprising:

turning on the high-voltage direct-charging chip, wherein an output end of the charging interface is connected to an input end of the high-voltage direct-charging chip, and an output end of the high-voltage direct-charging chip is connected to the battery to output a charging current to the battery;

outputting a first current to the high-voltage direct-charging chip through the charging interface; and increasing the charging current by a first predetermined current and then outputting the charging current to the battery through the high-voltage direct-charging chip step by step until the charging current reaches a first target current, wherein the first target current is a working current of the high-voltage direct-charging chip, and each step has an interval of the first predetermined current and wherein an input end of the charging interface is connected to an output end of a charger, the method further comprises:

outputting a second current, which is lower than the first current, to the high-voltage direct-charging chip through the charging interface under the condition that the high-voltage direct-charging chip is turned off;

acquiring a voltage at the output end of the charger and a voltage at the input end of the high-voltage direct-charging chip;

obtaining a first line impedance between the charger and the high-voltage direct-charging chip in accordance with the second current, the voltage at the output end of the charger and the voltage at the input end of the high-voltage direct-charging chip; and turning on the high-voltage direct-charging chip when the first line impedance is smaller than a predetermined impedance.

2. The method according to claim 1, further comprising:

when the charging current reaches the first target current, reducing the charging current by a second predetermined current and then outputting the charging current to the battery through the high-voltage direct-charging chip every time till the charging current reaches a second target current which is the charging current when the battery is fully charged, and lower than the first target current.

3. The method according to claim 1, further comprising:

when the charging current reaches the first target current, reducing the charging current by a second predetermined current and then outputting the reduced charging current to the battery through the high-voltage direct-charging chip every time; and when the charging current reaches a third target current, reducing the charging current by a third predetermined current and then outputting the reduced charging current to the battery every time till the charging current reaches a second target current which is the charging current when the battery is fully charged, wherein the third predetermined current is lower than the second predetermined current, the second target current is lower than the first target current, and the third predetermined current is lower than the first target current and higher than the second target current.

4. The method according to claim 2, wherein the charging circuit further comprises a master charging chip, the output end of the charging interface is connected to an input end of the master charging chip, an output end of the master charging chip is connected to the battery, the method further comprises:

when the charging current reaches the second target current, turning off the high-voltage direct-charging chip and turning on the master charging chip.

5. The charging method according to claim 1, further comprising:

acquiring the voltage at the output end of the charger and the voltage at the input end of the high-voltage direct-charging chip in a process that the charging interface outputs the first current to the high-voltage direct-charging chip; and obtaining a second line impedance between the charger and the high-voltage direct-charging chip in accordance with the first current, the voltage at the output end of the charger and the voltage at the input end of the high-voltage direct-charging chip.

6. The charging method according to claim 5, further comprising:

when a difference value between the first line impedance and the second line impedance is greater than a predetermined threshold, turning off the high-voltage direct-charging chip, outputting the second current to the high-voltage direct-charging chip through the charging interface, and re-executing the step of obtaining the first line impedance.

7. The method according to claim 3, wherein the charging circuit further comprises a master charging chip, the output end of the charging interface is connected to an input end of the master charging chip, an output end of the master charging chip is connected to the battery, the method further comprises:

when the charging current reaches the second target current, turning off the high-voltage direct-charging chip and turning on the master charging chip.

8. An electronic device, comprising a charging interface, a charging circuit, and a battery, wherein the charging circuit comprises a high-voltage direct-charging chip, an output end of the charging interface is connected to an input end of the high-voltage direct-charging chip, and an output end of the high-voltage direct-charging chip is connected to the battery; and the electronic device is configured to execute acts comprising:

turning on the high-voltage direct-charging chip;

outputting a first current to the high-voltage direct-charging chip through the charging interface; and increasing the charging current by a first predetermined current and then outputting the charging current to the battery through the high-voltage direct-charging chip step by step until the charging current reaches a first target current wherein the first target current is a working current of the high-voltage direct-charging chip, and each step has an interval of the first predetermined current; and wherein an input end of the charging interface is connected to an output end of a charger, and the electronic device is configured to further execute following actions:

outputting a second current, which is lower than the first current, to the high-voltage direct-charging chip through the charging interface under the condition that the high-voltage direct-charging chip is turned off;

acquiring a voltage at the output end of the charger and a voltage at the input end of the high-voltage direct-charging chip;

obtaining a first line impedance between the charger and the high-voltage direct-charging chip in accordance with the second current, the voltage at the output end of the charger and the voltage at the input end of the high-voltage direct-charging chip; and turning on the high-voltage direct-charging chip when the first line impedance is smaller than a predetermined impedance.

9. The electronic device according to claim 8, wherein it is configured to further execute following actions:

when the charging current reaches the first target current, reducing the charging current by a second predetermined current and then outputting the charging current to the battery through the high-voltage direct-charging chip every time till the charging current reaches a second target current which is the charging current when the battery is fully charged, and lower than the first target current.

10. The electronic device according to claim 8, wherein it is configured to further execute following actions:

when the charging current reaches the first target current, reducing the charging current by a second predetermined current and then outputting the reduced charging current to the battery through the high-voltage direct-charging chip every time; and when the charging current reaches a third target current, reducing the charging current by a third predetermined current and then outputting the reduced charging current to the battery every time till the charging current reaches a second target current which is the charging current when the battery is fully charged, wherein the third predetermined current is lower than the second predetermined current, the second target current is lower than the first target current, and the third predetermined current is lower than the first target current and higher than the second target current.

11. The electronic device according to claim 9, wherein the charging circuit further comprises a master charging chip, the output end of the charging interface is connected to an input end of the master charging chip, an output end of the master charging chip is connected to the battery, and the electronic device is configured to further execute following actions:

when the charging current reaches the second target current, turning off the high-voltage direct-charging chip and turning on the master charging chip.

12. The electronic device according to claim 8, wherein it is configured to further execute following actions:

acquiring the voltage at the output end of the charger and the voltage at the input end of the high-voltage direct-charging chip in a process that the charging interface outputs the first current to the high-voltage direct-charging chip; and obtaining a second line impedance between the charger and the high-voltage direct-charging chip in accordance with the first current, the voltage at the output end of the charger and the voltage at the input end of the high-voltage direct-charging chip.

13. The electronic device according to claim 12, wherein it is configured to further execute following actions:

when a difference value between the first line impedance and the second line impedance is greater than a predetermined threshold, turning off the high-voltage direct-charging chip, outputting the second current to the high-voltage direct-charging chip through the charging interface, and re-executing the step of obtaining the first line impedance.

\* \* \* \* \*